(12) United States Patent
Inoue et al.

(10) Patent No.: US 11,292,167 B2
(45) Date of Patent: Apr. 5, 2022

(54) CASSETTE TYPE MOLD APPARATUS

(71) Applicant: SODICK CO., LTD., Kanagawa (JP)

(72) Inventors: Satoru Inoue, Kanagawa (JP); Shuji Aiba, Kanagawa (JP); Shigeru Takakura, Kanagawa (JP)

(73) Assignee: Sodick Co., Ltd., Kanagawa (JP)

(*) Notice: Subject to any disclaimer, the term of this patent is extended or adjusted under 35 U.S.C. 154(b) by 251 days.

(21) Appl. No.: 15/806,335

(22) Filed: Nov. 8, 2017

(65) Prior Publication Data

US 2018/0126614 A1    May 10, 2018

(30) Foreign Application Priority Data

Nov. 10, 2016  (JP) .............................. JP2016-219524

(51) Int. Cl.
*B29C 45/26* (2006.01)
*B29C 45/40* (2006.01)

(52) U.S. Cl.
CPC ........ *B29C 45/2673* (2013.01); *B29C 45/401* (2013.01)

(58) Field of Classification Search
CPC ............ B29C 45/2673; B29C 45/2675; B29C 45/1756; B29C 45/2708
See application file for complete search history.

(56) References Cited

U.S. PATENT DOCUMENTS

| | | | | |
|---|---|---|---|---|
| 4,867,668 A | * | 9/1989 | Miyairi | B29C 45/2673 425/192 R |
| 5,783,224 A | * | 7/1998 | Heinlen | B29C 33/302 249/160 |
| 5,962,042 A | * | 10/1999 | Konno | B29C 45/2708 425/542 |
| 6,464,909 B1 | * | 10/2002 | Kazmer | B29C 45/766 264/40.1 |
| 6,713,002 B2 | * | 3/2004 | Kazmer | B29C 45/766 264/40.1 |
| 6,769,896 B2 | * | 8/2004 | Kazmer | B29C 45/766 425/145 |
| 7,048,532 B2 | * | 5/2006 | Tabassi | B29C 45/281 425/564 |
| 7,419,625 B2 | * | 9/2008 | Vasapoli | B29C 45/2701 264/40.1 |

(Continued)

FOREIGN PATENT DOCUMENTS

| | | |
|---|---|---|
| JP | S6338072 | 2/1988 |
| JP | H1134119 | 2/1999 |

*Primary Examiner* — Niki Bakhtiari
*Assistant Examiner* — Nicholas J Chidiac
(74) *Attorney, Agent, or Firm* — JCIPRNET

(57) ABSTRACT

A cassette type mold apparatus includes a sub-runner formed on a parting surface of a fixed side matrix or a movable side matrix, a gate provided in a fixed side cassette mold or a movable side cassette mold and configured to inject a molten resin into a cavity space from the sub-runner, and a hot runner provided on the fixed side matrix so that a tip end thereof is aligned with the sub-runner to be perpendicular to the sub-runner and is in parallel with a mold opening and closing direction. In the cassette type mold apparatus, the movable side cassette mold can be stacked on the fixed side cassette mold in a state in which a cavity and a core are aligned and can be integrally loaded in a direction of a side surface of the entire mold.

5 Claims, 4 Drawing Sheets

(56) References Cited

U.S. PATENT DOCUMENTS

| | | | |
|---|---|---|---|
| 7,569,169 B2* | 8/2009 | Vasapoli | B29C 45/768 264/40.1 |
| 7,901,601 B2* | 3/2011 | Vasapoli | B29C 45/30 264/40.1 |
| 8,016,581 B2* | 9/2011 | Vasapoli | B29C 45/2806 425/145 |
| 10,207,441 B2* | 2/2019 | Kawamura | B30B 11/007 |
| 2003/0150586 A1* | 8/2003 | Matsuura | B22D 17/22 164/137 |
| 2003/0155672 A1* | 8/2003 | Kazmer | B29C 45/2701 264/40.1 |
| 2003/0180409 A1* | 9/2003 | Kazmer | B29C 45/30 425/145 |
| 2003/0198702 A1* | 10/2003 | Kazmer | B29C 45/77 425/135 |
| 2004/0001901 A1* | 1/2004 | Towery | B29C 45/2673 425/190 |
| 2004/0109914 A1* | 6/2004 | Tabassi | B29C 45/281 425/564 |
| 2005/0033237 A1* | 2/2005 | Fentress | B29C 45/16 604/165.03 |
| 2005/0200048 A1* | 9/2005 | Fujii | B29C 45/2806 264/328.16 |
| 2007/0224303 A1* | 9/2007 | Vasapoli | B29C 45/7686 425/146 |
| 2007/0286918 A1* | 12/2007 | Crain | B29C 33/74 425/175 |
| 2008/0026096 A1* | 1/2008 | Rozema | B29C 45/2673 425/562 |
| 2008/0315445 A1* | 12/2008 | Vasapoli | B29C 45/30 264/40.5 |
| 2009/0028986 A1* | 1/2009 | Vasapoli | B29C 45/766 425/563 |
| 2009/0061034 A1* | 3/2009 | Vasapoli | B29C 45/768 425/145 |
| 2011/0291328 A1* | 12/2011 | Vasapoli | B29C 45/30 264/328.1 |
| 2012/0318654 A1* | 12/2012 | Harris | B60K 37/06 200/336 |
| 2017/0291339 A1* | 10/2017 | Kawamura | B29C 45/84 |

* cited by examiner

CASSETTE TYPE MOLD APPARATUS

CROSS-REFERENCE TO RELATED APPLICATION

This application claims the priority benefit of Japanese application serial no. 2016-219524, filed on Nov. 10, 2016. The entirety of the above-mentioned patent application is hereby incorporated by reference herein and made a part of this specification.

BACKGROUND OF THE DISCLOSURE

Field of the Disclosure

The disclosure relates to a mold apparatus. In particular, the disclosure relates to a cassette type mold apparatus in which a cassette mold is loaded into a matrix in a direction of a side surface of a mold body in a vertical injection molding machine.

Description of Related Art

A mold apparatus is a structure including a fixed mold and a movable mold. In particular, the mold apparatus is an assembly formed by mainly combining an ejector, a resin flow path and a temperature control pipe with the fixed mold and the movable mold. A cassette type mold apparatus is a mold apparatus formed of a matrix (base mold) in which the fixed mold and the movable mold are respectively a basic structure and a cassette mold in which a cavity or a core is formed, and only the cassette mold can be exchanged.

A structure of a cassette mold in a vertical injection molding machine can be classified as an "orthogonal type structure" in which the cassette mold is loaded into the matrix in a direction orthogonal to a parting surface on which the fixed mold and the movable mold are combined, in other words, a vertical direction of the entire mold; or a "parallel type structure" in which the cassette mold is loaded into the matrix from a direction in parallel with the parting surface, in other words, a direction of a side surface of the entire mold. The parallel type structure reduces a burden on a worker as compared with the orthogonal type structure. Therefore, there are some advantages that work efficiency is good and a time for exchanging the cassette mold is comparatively short. For example, Patent Document 1 or Patent Document 2 discloses a cassette type mold apparatus having a parallel type structure.

PRIOR ART DOCUMENT

Patent Documents

[Patent Document 1] Japanese Unexamined Patent Application Publication No. S63-38072
[Patent Document 2] Japanese Unexamined Patent Application Publication No. H11-34119

SUMMARY OF THE DISCLOSURE

However, a hot runner type mold has advantages that an amount of molding material to be used can be reduced and quality of a molded product can be increased, but also has disadvantages that a configuration of the mold apparatus becomes complicated and maintenance becomes difficult. The cassette type mold apparatus is suitable for molded products of small quantity production, and thus the hot runner type mold is suitable for the cassette type mold apparatus. In the hot runner type mold, a means for preventing leakage and backflow of a resin is necessary, but unless there are special circumstances, a pressure of the molten resin is stabilized, and a molding cycle can be shortened, and thus it is advantageous to provide a valve gate having a smaller restriction on the structure of the mold.

When the valve gate is provided in a hot runner method, since a tip end of a hot runner has a tapered shape and protrudes against the parting surface, it is necessary to align the tip end of the hot runner vertically with respect to the parting surface when assembling the hot runner to the mold. Therefore, the cassette type mold with the hot runner type valve gate is forced to have the orthogonal type structure.

The disclosure provides a cassette type mold apparatus which has a hot runner type valve gate and also has a parallel type structure. Further, the disclosure provides a cassette type mold apparatus which is capable of substantially communicating a resin flow path and a temperature control pipe simply by sliding and loading a cassette type mold into a matrix. Several advantages achieved in the disclosure will be specifically shown in each embodiment of the disclosure.

A cassette type mold apparatus of the disclosure including a fixed side matrix installed at and fixed to a fixed platen of a vertical injection molding machine, a movable side matrix installed at and fixed to a movable platen disposed to face the fixed platen, a fixed side cassette mold loaded in the fixed side matrix, and a movable side cassette mold loaded in the movable side matrix includes a sub-runner formed on at least a parting surface of the fixed side matrix or the movable side matrix, a gate provided in at least the fixed side cassette mold or the movable side cassette mold and configured to inject a molten resin into a cavity space from the sub-runner, and a hot runner provided on the fixed side matrix so that a tip end thereof is aligned with the sub-runner to be perpendicular to the sub-runner and provided to be in parallel with a mold opening and closing direction, wherein the movable side cassette mold is stacked on the fixed side cassette mold in a state in which a cavity and a core are aligned and is integrally loaded in a direction of a side surface of the entire mold.

Particularly, in the cassette type mold apparatus of the disclosure, a plurality of rolling guides, for example, free ball bearings, provided to be rotatable are provided on an upper surface of the fixed side matrix. Further, the cassette type mold apparatus of the disclosure has a configuration which includes a fixed side wear plate configured to support the fixed side cassette mold, a movable side wear plate configured to support the movable side cassette mold, a pair of wedge-shaped blocks provided in each of the fixed side matrix and the movable side matrix and configured to reciprocate in a horizontal direction, and a plurality of air cylinders configured to move the pair of wedge-shaped blocks toward the fixed side wear plate and the movable side wear plate, and the wedge-shaped blocks are fitted to both edges of each of the fixed side wear plate and the movable side wear plate to fix the fixed side cassette mold to the fixed side matrix and to fix the movable side cassette mold to the movable side matrix.

Preferably, a configuration in which, in a joining surface at which the fixed side matrix and the fixed side cassette mold are joined and a joining surface at which the movable side matrix and the movable side cassette mold are joined, one or more openings of temperature control pipes are provided and an annular elastic seal is provided in each of the openings in the fixed side matrix and the movable side matrix, and the opening is liquid-sealed by a joining force due to the wedge-shaped blocks is provided.

Further, in the cassette type mold apparatus of the disclosure, an ejector plate at which one or more ejector pins passing through the movable side cassette mold and protruding into the cavity space are installed is erected is disposed on the movable side cassette mold and is integrally loaded with the fixed side cassette mold and the movable side cassette mold from the direction of the side surface of the entire mold.

Reference numerals in parentheses are identical to reference numerals written in the drawing. However, the reference numerals in parentheses are provided for convenience of explanation, and are not intended to limit the disclosure to the cassette type mold apparatus of the specific embodiment illustrated in the drawings.

In the disclosure, since the sub-runner and the gate are forming on the parting surface and the molten resin is supplied to the cavity through the sub-runner, by aligning the tip end of the hot runner to be orthogonal to the sub-runner, the hot runner can be provided on the fixed side matrix to be in parallel with the mold opening and closing direction. Therefore, in a hot runner type cassette mold apparatus, the cassette mold can be loaded in the direction of the side surface of the entire mold. As a result, it is possible to reduce the burden on the worker and to shorten the exchange time of the cassette mold.

When the disclosure has the configuration in which the rolling guides such as the free ball bearings which are provided to be rotatable are provided on the upper surface of the fixed side matrix, it is possible to more easily load the cassette mold having a relatively large mass into the matrix. As a result, it is possible to reduce the burden on the worker and to shorten the exchange time of the cassette mold.

Particularly, in the case of the configuration in which the wedge-shaped blocks are fitted to both edges of the wear plate and thus the cassette mold is fixed to be pressed on the matrix, the cassette mold can be relatively strongly fixed by the air cylinder. As a result, the burden on the worker can be further reduced, and the time for exchanging the cassette mold can be further shortened. Moreover, the construction of the mold apparatus can be formed to be relatively simple, a size thereof can be smaller, and thus handling thereof can be easier. In addition, since the cassette mold is joined to the matrix with a sufficient force, it is possible to connect a resin flow path with the temperature control pipe without manual work.

Also, in the disclosure, when the ejector plate in which one or more ejector pins are erected is disposed above the movable side cassette mold and is loaded into the matrix integrally with the cassette mold, it is possible to set the ejector by simply preparing and installing the ejector plate in which the ejector pins are appropriately disposed according to a shape of the cavity space. As a result, it is possible to further reduce the burden on the worker and to further shorten the exchange time of the cassette mold. Further, restriction on the cavity space becomes smaller, and thus convenience is high.

DESCRIPTION OF THE EMBODIMENTS

Figure 4:
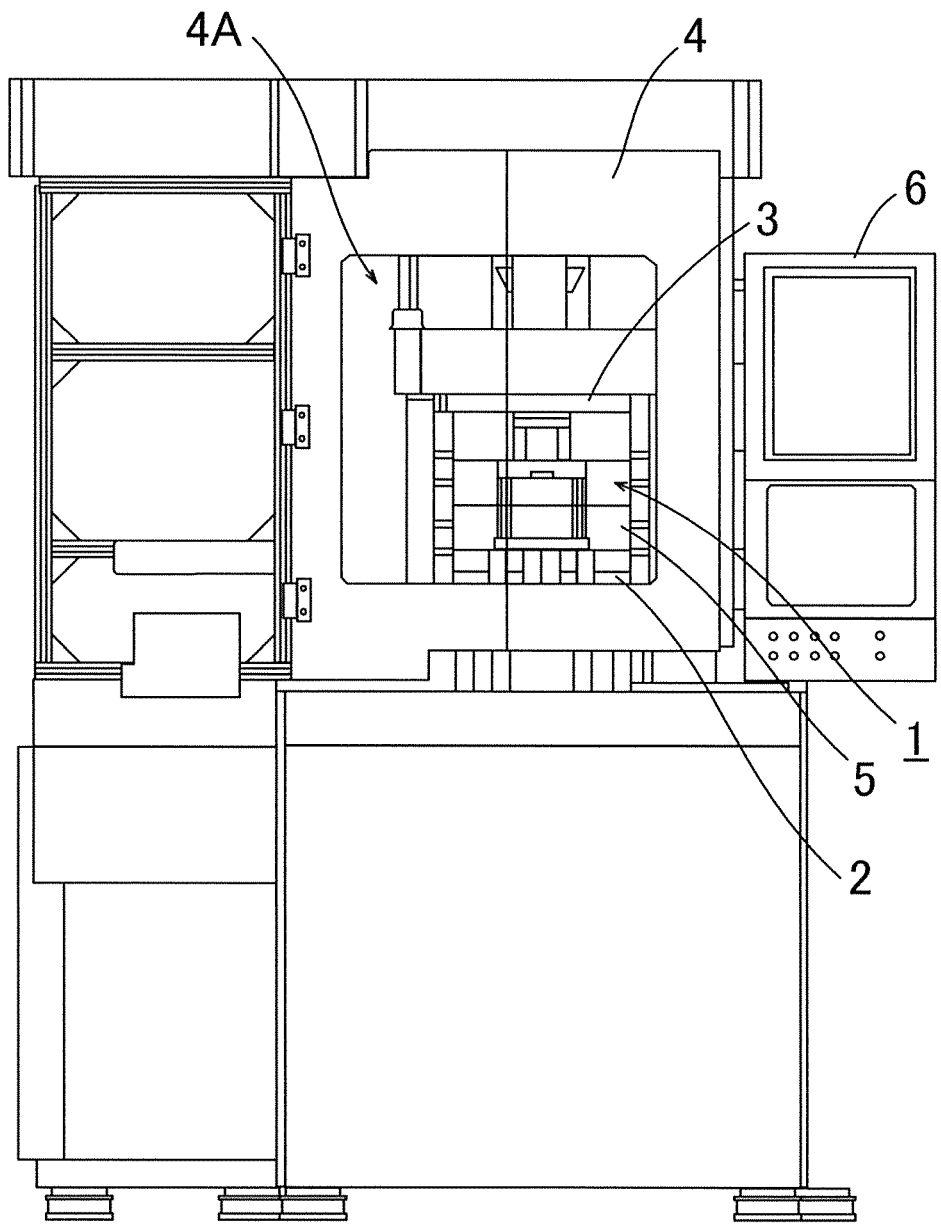
FIG. 4 is a front view of a vertical injection molding machine in which the cassette type mold apparatus is installed.

As illustrated in FIG. 4, for example, a vertical injection molding machine has a fixed platen 2 and a movable platen 3 in which a cassette type mold apparatus 1 can be installed. The fixed platen 2 is disposed below a molding space 4A accommodating a mold 5 formed by a chamber 4. The movable platen 3 is disposed above the fixed platen 2 in the molding space 4A. A worker can operate a cassette type mold apparatus 1 outside the chamber 4 through a control device of the injection molding machine by operating the operation panel 6.

Figure 1:
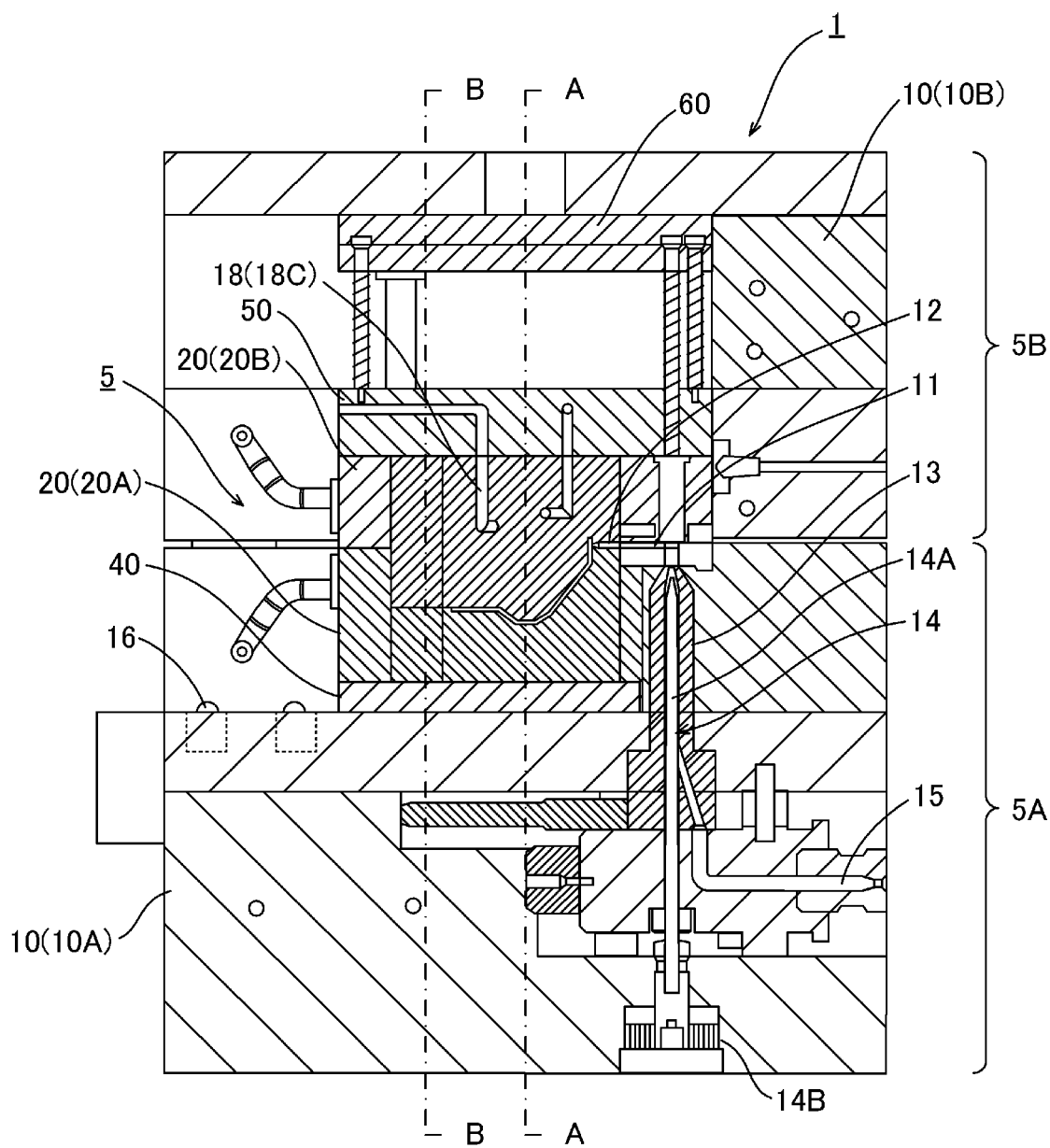
FIG. 1 is a right side sectional view of a cassette type mold apparatus of the disclosure.

The mold 5 shows only a body of a mold including one or more metal blocks in a state in which assembled parts are removed from the cassette type mold apparatus 1. As illustrated in FIG. 1, the mold 5 includes a fixed mold 5A and a movable mold 5B. Specifically, the mold 5 includes a fixed side matrix 10A and a movable side matrix 10B which are matrixes 10 of the cassette type mold apparatus 1, and a fixed side cassette mold 20A and a movable side cassette mold 20B which are cassette molds 20. The fixed side matrix 10A is installed at and fixed to the fixed platen 2, and the movable side matrix 10B is installed at and fixed to the movable platen 3.

Figure 2:
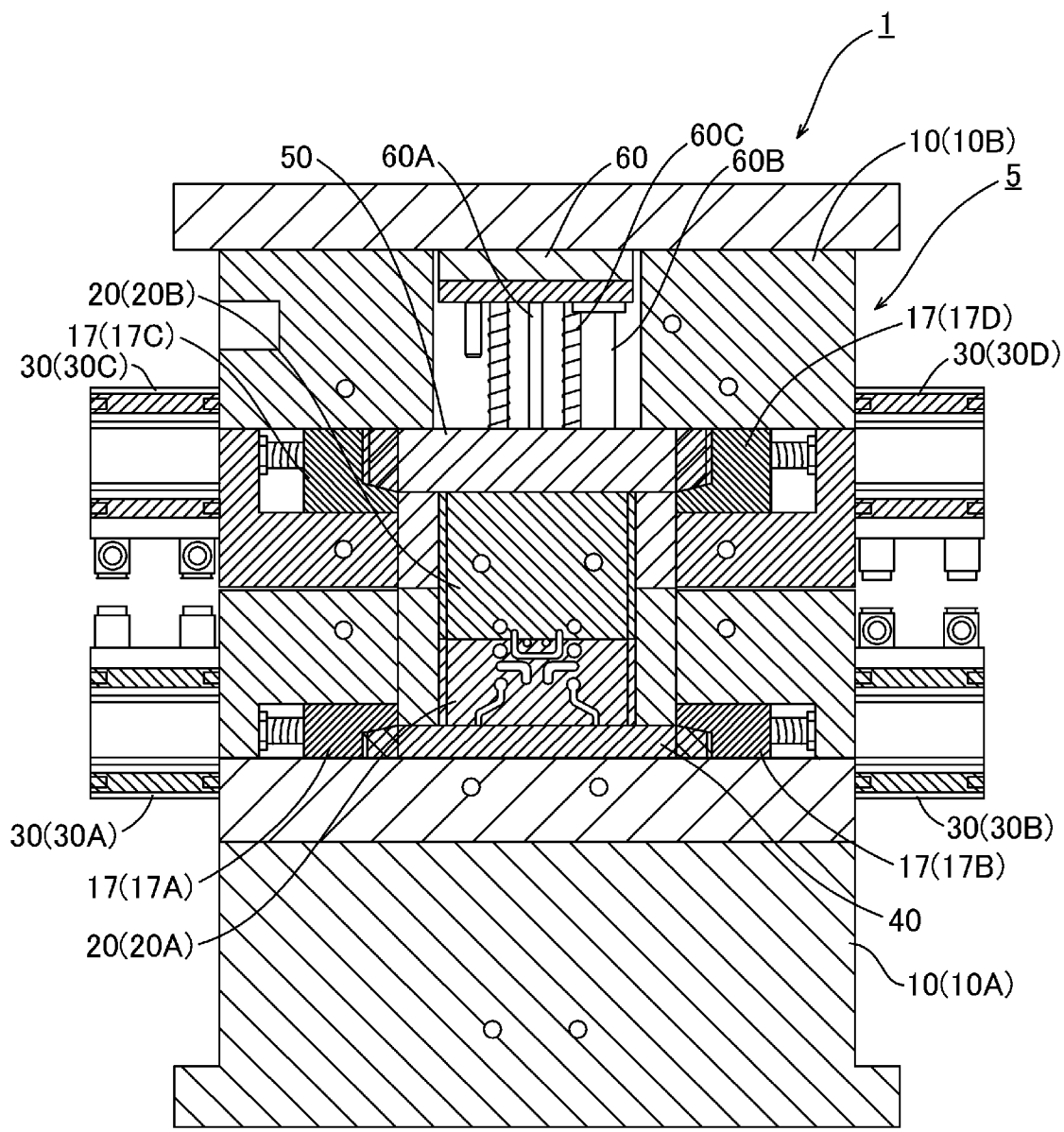
FIG. 2 is a cross-sectional view taken along line A-A in the cassette type mold apparatus illustrated in FIG. 1.

As illustrated in FIGS. 1 and 2, the cassette type mold apparatus 1 includes the matrix 10, a cassette mold 20, an air cylinder 30, a fixed side wear plate 40, a movable side wear plate 50 and an ejector plate 60. Further, the cassette type mold apparatus 1 includes a sub-runner 11, a gate 12, a hot runner 13, a valve gate 14, a sprue 15, a free ball bearing 16, a wedge-shaped block 17 and a temperature control pipe 18 which are provided in the mold 5. However, illustration and explanation of a configuration in which a molding material is heated and melted and a molten resin is insulated and kept warm are omitted.

The cassette type mold apparatus 1 has a parallel type structure in which the movable side cassette mold 20B is stacked on the fixed side cassette mold 20A in a state in which a cavity and a core are aligned with each other and is then integrally mounted in the matrix 10 in a direction of an entire side surface of one pair of molds 5. Hereinafter, an assembly of the cassette molds 20 which is integrally loaded into the matrix 10 is referred to as a cassette unit. In the cassette type mold apparatus 1 of the embodiment, the cassette unit is formed by stacking, in turn, the fixed side wear plate 40, the fixed side cassette mold 20A, the movable side cassette mold 20B, the movable side wear plate 50 and the ejector plate 60 from a bottom.

The sub-runner 11 is formed on a parting surface of the fixed side matrix 10A or the movable-side matrix 10B, or both of them between the gate 12 and a tip end of the hot runner 13. The sub-runner 11 supplies a molten resin introduced from the hot runner 13 to the gate 12 in a horizontal direction. More specifically, when the fixed mold 5A and the movable mold 5B are joined to each other, the sub-runner 11 is formed by combining the parting surfaces facing grooves or the grooves between the fixed side matrix 10A and the movable side matrix 10B. The molten resin is prevented from leaking from the sub-runner 11 by a mold coupling force when the molds are coupled.

The gate 12 is provided by forming a gate-shaped through-hole in the fixed side cassette mold 20A or the movable side cassette mold 20B in a fine hole electric discharge machining method to be connected to the sub-runner 11. The gate 12 communicates with the sub-runner 11 and injects the molten resin supplied from the sub-runner 11 into a cavity space in the horizontal direction. Half gate-shaped holes may be formed in both of the fixed side cassette mold 20A and the movable side cassette mold 20B, and when the fixed mold 5A and the movable mold 5B are joined, the holes may be combined so that the gate 12 is formed. At this time, the molten resin is prevented from leaking from the gate 12 by the mold coupling force when the molds are coupled.

The hot runner 13 is provided on the fixed side matrix 10A so that a tip end thereof is aligned with the sub-runner 11 to be perpendicular to the sub-runner 11 and thus provided to be in parallel with a mold opening and closing direction. The hot runner 13 opens the valve gate 14 only when a molten resin is supplied to the cavity space, and allows the molten resin to flow into the sub-runner 11.

The valve gate 14 opens and closes a molten resin flow path of the hot runner 13. In the valve gate 14, a valve pin 14A is provided coaxially in the molten resin flow path of the hot runner 13. The valve pin 14A which directly opens and closes the molten resin flow path is operated by a drive device 14B provided on the fixed platen 2 side of the fixed side matrix 10A.

The sprue 15 is provided horizontally on the fixed side matrix 10A. The sprue 15 guides the molten resin from a molten resin introduction port connected to an injection nozzle which is not illustrated in the mold 5 to a molten resin introduction path of the hot runner 13. Therefore, an injection cylinder can be installed horizontally so that the injection nozzle is connected to a side surface of the mold 5, and thus an ejector drive device can be provided above the mold 5. Therefore, the sprue 15 assists in realizing a cassette type mold apparatus of a hot runner method having a parallel type structure. The sprue 15 can heat the molten resin to a predetermined temperature by a heater which is not illustrated and can keep it warm and maintain the resin in a molten state during molding together with the hot runner 13.

The free ball bearing 16 is one of rolling guides which reduces a frictional force generated when the cassette unit including the cassette mold 20 is slid and set on the matrix 10. A plurality of free ball bearings 16 are linearly disposed in one or more rows on a guide surface for guiding the cassette mold 20A on an upper surface of the fixed side matrix 10A to the matrix 10 in a direction in which the cassette unit is slid and are provided to be rotatable. The cassette unit is slid by the free ball bearing 16 while being floated a few millimeters from the fixed side matrix 10A. The free ball bearing 16 reduces a burden of loading the cassette mold 20 into the matrix 10.

The wedge-shaped block 17 is provided on each of the fixed side matrix 10A and the movable side matrix 10B and moves in the horizontal direction together with some metal blocks forming the matrix 10. By simultaneously fitting a plurality of wedge-shaped blocks 17 to both edges of the fixed side wear plate 40 and both edges of the movable side wear plate 50, the fixed side cassette mold 20A is fixed to the fixed side matrix 10A, and the movable side cassette mold 20B is fixed to the movable side matrix 10B.

The wedge-shaped block 17 moves toward the fixed side wear plate 40 or the movable side wear plate 50 when compressed air is supplied to the air cylinder 30 and moves away from the fixed side wear plate 40 or the movable side wear plate 50 when the air in the air cylinder 30 is removed. For example, one pair of wedge-shaped blocks 17A and 17B are moved in a direction of both edges of the fixed side wear plate 40 by the air cylinders 30A and 30B, one pair of wedge-shaped blocks 17C and 17D are moved in a direction of both edges of the movable side wear plate 50 by the air cylinders 30C and 30D, and thus four wedge-shaped blocks are moved at the same time.

Due to the plurality of wedge-shaped blocks 17, a large clamping force can be generated with a relatively small force, and a locking state can be relatively easily released. Therefore, there is an advantage that a size of the cassette type mold apparatus 1 can be made compact. Further, since it is unnecessary to manually clamp the cassette mold 20 to the matrix 10, workability is improved. In addition, it is advantageous in that the cassette mold 20 can be semi-automatically loaded.

Figure 3:
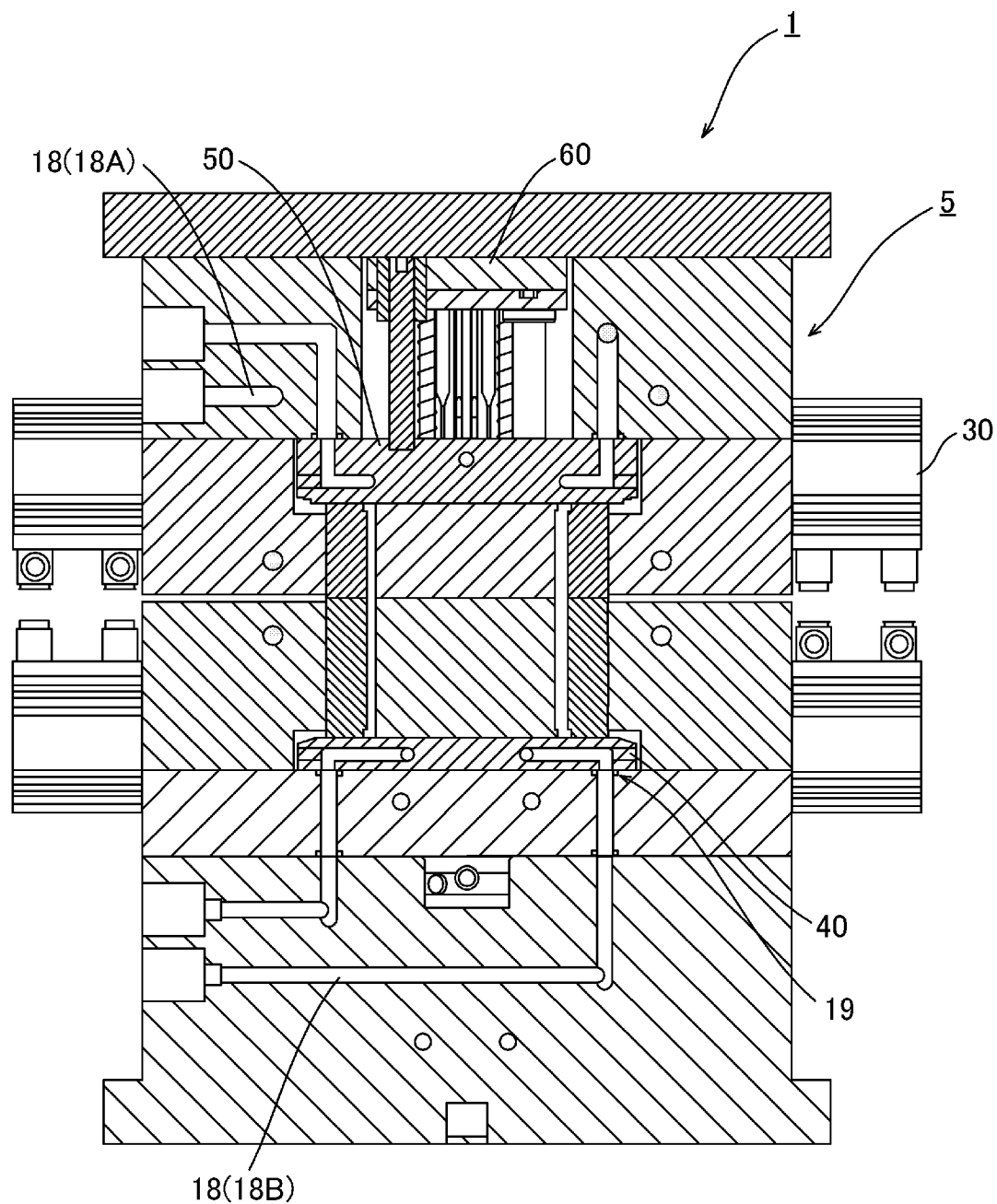
FIG. 3 is a cross-sectional view taken along line B-B in the cassette type mold apparatus illustrated in FIG. 1.

As illustrated in FIGS. 1 and 3, the temperature control pipe 18 has three systems including a first path 18A, a second path 18B and a third path 18C. The temperature control pipe 18 is provided in each of the fixed mold 5A and the movable mold 5B. The first path 18A is provided in the fixed side matrix 10A and the movable side matrix 10B and adjusts a temperature of the matrix 10. The second path 18B is provided in the fixed side cassette mold 20A and the movable side cassette mold 20B and adjusts a temperature of the cassette mold 20. The third path 18C is provided up to the vicinity of the cavity or the core of the fixed side cassette mold 20A and the movable side cassette mold 20B and locally adjusts a temperature of the cavity and the core.

In a joining surface at which the fixed side matrix 10A and the fixed side cassette mold 20A are joined and a joining surface at which the movable side matrix 10B and the movable side cassette mold 20B are joined, one or more openings of the temperature control pipes 18 are provided. In the cassette type mold apparatus 1 of the embodiment, an opening on a side for supplying a temperature control medium in the second path 18B and the third path 18C of the temperature control pipe 18 and an opening on a side for discharging the temperature control medium are provided.

As illustrated in FIG. 3, for example, an annular elastic seal 19 such as an O-ring formed of a resin is fixed to and provided at each opening of the temperature control pipe 18 in the fixed side matrix 10A and the movable side matrix 10B. When the cassette mold 20 is fixed to the matrix 10, the elastic seal 19 is compressed by a joining force generated when the cassette mold 20 is clamped by the plurality of wedge-shaped blocks 17, and thus the opening is liquid-sealed. Therefore, the pipe can be connected merely by loading and fixing the cassette mold 20 to the matrix 10, and thus the workability is improved.

The ejector plate 60 has one or more ejector pins 60A. The ejector pins 60A are arbitrarily installed to pass through the movable side cassette mold 20B in accordance with a shape of the unspecified cavity space and to protrude into the cavity space. Since the ejector plate 60 operates the ejector pin 60A after being loaded in the matrix 10, the ejector plate 60 is disposed above the movable side cassette mold 20B at an interval by a plurality of support columns 60B. The ejector plate 60 is operated by a driving mechanism installed above the movable platen 3. A spring 60C is provided to return the ejector plate 60 to its original position after operation.

In the cassette type mold apparatus 1 of the embodiment, since the injection cylinder which is not illustrated is provided horizontally, the driving mechanism for the ejector pin 60A can be installed above the movable platen 3. Therefore, the ejector plate 60 can be disposed on the movable side cassette mold 20B. As a result, the ejector plate 60 is included in the cassette unit and is integrally loaded from the direction of the side surface of the entire mold together with the fixed side cassette mold 20A and the movable side cassette mold 20B.

Next, a method of exchanging the cassette mold of the cassette type mold apparatus 1 will be described. The fixed side cassette mold 20A and the movable side cassette mold 20B are respectively fixed to the fixed side wear plate 40 and the movable side wear plate 50 in advance. Outer shapes of the fixed side wear plate 40 and the fixed side cassette mold 20A, and the movable side wear plate 50 and the movable side cassette mold 20B are formed to match an installation space of the cassette unit in the matrix 10 regardless of a shape of the cavity space.

The cavity and the core are positioned so that the cavity space is formed in a shape of a desired molded article, and the movable side cassette mold 20B is stacked on the fixed side cassette mold 20A. In general, when the cassette mold 20 is manufactured, a portion such as a fitting hole for accurately positioning the fixed side cassette mold 20A and the movable side cassette mold 20B is formed, and thus even in the case of the mold 5 having a relatively large cavity space, alignment between the fixed side cassette mold 20A and the movable side cassette mold 20B is not a particularly difficult task.

Further, the ejector plate 60 is installed at the cassette mold 20. In the matrix 10, since the ejector plate 60 is provided on a side on which the driving mechanism for operating the ejector pin 60A is provided, it may be provided at either of the fixed side cassette mold 20A and the movable side cassette mold 20B. However, in order to integrally load the cassette unit into the matrix 10 from the direction of the side surface of the entire mold, it is basically preferable to install the ejector plate 60 on the movable side cassette mold 20B.

In the case of the cassette type mold apparatus 1 of the embodiment, one or more ejector pins 60A are aligned with the ejector pin hole provided in the movable side cassette mold 20B in accordance with the shape of the cavity space, and the ejector plate 60 is mounted on the movable side cassette mold 20B by the support column 60B while the ejector pin 60A is allowed to pass through the movable side cassette mold 20B and to protrude into the cavity space.

Next, the cassette unit is loaded on the plurality of free ball bearings 16 provided on the upper surface of the fixed side matrix 10A. At this time, the movable platen 3 is located 5 mm to 6 mm above a mold closing position, and the parting surface of the fixed side matrix 10A and the movable side matrix 10B is open. Therefore, the cassette unit is floated a few millimeters by the plurality of free ball bearings 16, but by pushing the cassette unit into the matrix 10, it is guided by the free ball bearings 16 and accommodated in the installation space of the matrix 10.

In a state in which the cassette unit is accommodated in the installation space of the matrix, the movable platen 3 is lowered to the mold closing position to align the parting surface of the fixed mold 5A and the movable mold 5B. Additionally, the plurality of air cylinders 30 are simultaneously operated, and the cassette mold 20 is clamped to the matrix 10 by fitting each pair of wedge-shaped blocks 17 in the fixed mold 5A and the movable mold 5B to both edges of each of the fixed side wear plate 40 and the movable side wear plate 50.

At this time, a force is increased and acts in a direction orthogonal to a direction in which the wedge-shaped block 17 is pushed according to a wedge principle, the matrix 10 and the cassette mold 20 are more strongly joined, and thus the opening of the temperature control pipe 18 is sealed while the elastic seal 19 is deformed. Therefore, by more reliably liquid-sealing the opening with a relatively simple structure, the cassette mold 20 can be semi-automatically set to the matrix 10 without intervention of the worker, and thus the workability is improved, and a time for exchanging the cassette mold can be shortened.

Further, when the mold is closed during a molding operation, since the fixed side cassette mold 20A and the movable side cassette mold 20B are strongly joined on the parting surface by the mold coupling force, the sub-runner 11 and the gate 12 which are formed on the parting surface are completely sealed, and there is no possibility of the molten resin leaking out. Therefore, the cassette mold 20 can be semi-automatically installed in the matrix 10 without the intervention of the worker, and thus the workability can be improved, and the time for exchanging the cassette mold can be shortened.

When the cassette mold 20 is separated from the matrix 10, the movable platen 3 is moved to the mold closing position, and the parting surface of the fixed side matrix 10A and the movable side matrix 10B is temporarily aligned. Additionally, the temperature control medium, for example, water remaining in the temperature control pipe 18 in the cassette mold 20 of both of the fixed side cassette mold 20A and the movable side cassette mold 20B, is discharged to the outside of the cassette mold 20 by so-called air purge. Subsequently, all of the plurality of air cylinders 30 are simultaneously operated to move the plurality of wedge-shaped blocks 17 away from the cassette unit, and thus the cassette mold 20 is unclamped.

Subsequently, the movable platen 3 is raised by about 5 mm to 6 mm to separate the parting surface of the fixed side matrix 10A and the movable side matrix 10B. At this time, since the clamping between the matrix 10 and the cassette mold 20 is released, the movable side cassette mold 20B and the ejector plate 60 are loaded on the fixed side cassette mold 20A. In this state, when the worker pulls out the cassette unit forward, the cassette unit is guided on the plurality of free ball bearings 16, and the worker can move the cassette unit to the outside of the matrix 10 without applying a large force.

Since the opening of the temperature control pipe in the joining surface between the matrix 10 and the cassette mold 20 is sealed only by the annular elastic seal 19 and the joining force of the clamping, and also since the mold coupling force is already released and thus the sub-runner 11 and the gate 12 are formed only by the clamping force, it is released without human intervention. Therefore, the advantages that the workability is improved and the time for exchanging the cassette mold can be shortened are obtained.

The disclosure should not be limited to the cassette type mold apparatus of the embodiment, and although some concrete examples have already been shown, they can be modified and implemented without departing from the technical idea of the disclosure. In addition, the disclosure can be implemented in combination with another disclosure or can be implemented by replacing a certain member with another member as long as the operation effect can be obtained. For example, as the rolling guides, guide rollers can be used in place of the free ball bearings in the cassette type mold apparatus of the embodiment.

The disclosure can be applied to the technical field of injection molding. The cassette type mold apparatus of the disclosure can further reduce the burden on the worker, can improve the work efficiency and can shorten the exchange time of the cassette mold. The disclosure contributes to development of plastic molding technology.

What is claimed is:

1. An injection molding machine, comprising:
an injection cylinder horizontally installed and equipped with an injection nozzle through which a molten resin is injected,
a fixed platen,
a movable platen vertically movable towards and away from the fixed platen,
a fixed side matrix installed at and fixed to the fixed platen,
a movable side matrix installed at and fixed to the movable platen,
a fixed side cassette mold loaded in the fixed side matrix,
a movable side cassette mold loaded in the movable side matrix,
a sub-runner formed on at least a parting surface of the fixed side matrix or the movable side matrix and supplies the molten resin in a horizontal direction to a cavity,
a gate provided in at least the fixed side cassette mold or the movable side cassette mold and configured to inject a molten resin into the cavity from the sub-runner,
a hot runner with a hot runner type valve gate in which a valve pin is provided coaxially in the molten resin flow path of the hot runner, provided on the fixed side matrix so that a tip end thereof is aligned with the sub-runner to be perpendicular to the sub-runner and provided to be in parallel with a mold opening and closing direction, and
a sprue provided horizontally on the fixed side matrix that has a molten resin introduction port connected to an injection nozzle on a side surface of the fixed side matrix and guides the molten resin from the injection nozzle to the hot runner,
wherein the sprue is connected to the hot runner to reach a midway of the molten resin flow path of the hot runner through a connecting pipe extended between the sprue and the hot runner along a bevel direction in relative to the sprue and the hot runner, and the molten resin flow path is fully opened and closed by insertion of the valve pin,
wherein an extending direction of the sprue is altered from a direction perpendicular to the mold opening and closing direction and parallel with the parting surface to a direction along an inserting direction of the valve pin for guiding the molten resin supplied from the horizontal direction to flow along the inserting direction of the valve pin,
wherein the movable side cassette mold is stacked on the fixed side cassette mold in a state in which the cavity and a core are aligned and is integrally loaded in a direction of the other side surface of the entire mold.

2. The injection molding machine according to claim 1, wherein a plurality of rolling guides provided to be rotatable are provided on an upper surface of the fixed side matrix.

3. The injection molding machine according to claim 1, wherein an ejector plate, at which one or more ejector pins passing through the movable side cassette mold and protruding into the cavity are installed, is disposed on the movable side cassette mold and is integrally loaded with the fixed side cassette mold and the movable side cassette mold from the direction of the side surface of the entire mold.

4. The injection molding machine according to claim 1, comprising a fixed side wear plate configured to support the fixed side cassette mold, a movable side wear plate configured to support the movable side cassette mold, a pair of wedge-shaped blocks provided in each of the fixed side matrix and the movable side matrix and configured to reciprocate in the horizontal direction, and a plurality of air cylinders configured to move the pair of wedge-shaped blocks toward the fixed side wear plate and the movable side wear plate,
wherein the wedge-shaped blocks are fitted to both edges of each of the fixed side wear plate and the movable side wear plate to fix the fixed side cassette mold to the fixed side matrix and to fix the movable side cassette mold to the movable side matrix.

5. The injection molding machine according to claim 4, wherein, in a joining surface at which the fixed side matrix and the fixed side cassette mold are joined and a joining surface at which the movable side matrix and the movable side cassette mold are joined, one or more openings of temperature control pipes are provided, an annular elastic seal is provided in each of the openings in the fixed side matrix and the movable side matrix, and the opening is liquid-sealed by a joining force due to the wedge-shaped blocks.

* * * * *